United States Patent
Haudry et al.

(10) Patent No.: US 7,268,987 B2
(45) Date of Patent: Sep. 11, 2007

(54) MOTOR STARTER DEVICE

(75) Inventors: Jean Haudry, Vernouillet (FR); René Lecomte, Argenteuil (FR); Frédéric Marty, Suresnes (FR)

(73) Assignee: Schneider Electric Industries SAS, Rueil-Malmaison (FR)

( * ) Notice: Subject to any disclaimer, the term of this patent is extended or adjusted under 35 U.S.C. 154(b) by 554 days.

(21) Appl. No.: 10/467,324

(22) PCT Filed: Jan. 25, 2002

(86) PCT No.: PCT/FR02/00308

§ 371 (c)(1),
(2), (4) Date: Aug. 6, 2003

(87) PCT Pub. No.: WO02/065498

PCT Pub. Date: Aug. 22, 2002

(65) Prior Publication Data

US 2004/0066592 A1    Apr. 8, 2004

(30) Foreign Application Priority Data

Feb. 9, 2001   (FR) .................................. 01 01961

(51) Int. Cl.
 H02H 5/04 (2006.01)
(52) U.S. Cl. ....................................................... 361/23
(58) Field of Classification Search .................. 361/23
 See application file for complete search history.

(56) References Cited

U.S. PATENT DOCUMENTS

| 4,644,308 | A |   | 2/1987 | Guery et al. ................. 335/128 |
| 4,803,587 | A |   | 2/1989 | Fournier et al. ............... 361/24 |
| 5,006,682 | A | * | 4/1991 | Sloff et al. .................... 200/429 |
| 5,301,083 | A |   | 4/1994 | Grass et al. ................... 361/64 |
| 5,485,134 | A |   | 1/1996 | Seymour et al. ............. 335/132 |
| 5,525,948 | A | * | 6/1996 | Poulsen ........................ 335/128 |
| 5,808,846 | A | * | 9/1998 | Holce et al. ................. 361/93.6 |

FOREIGN PATENT DOCUMENTS

EP    0 511 042 A1    10/1992

* cited by examiner

Primary Examiner—Stephen W. Jackson
Assistant Examiner—Lucy Thomas
(74) Attorney, Agent, or Firm—Steptoe & Johnson LLP

(57) ABSTRACT

A motor starter device having an elongated base provided with power poles acted upon by a contactor part and a protection part. The base houses power current lines 15 and their control mechanism 20. Two movable linkages (30, 40) are associated with the mechanism, namely a first linkage 30 controlled by the electromagnet in the contactor part 16 and a second linkage 40 moved by the tripping device 18 in the protection part or by the manual control button 17. The linkages actuate signaling contacts 31, 32, 41, 42, 43 44 staggered on different levels, these contacts being housed in removable blocks A, B, added onto the housing in a fixed part C subjacent to the housing.

8 Claims, 2 Drawing Sheets

MOTOR STARTER DEVICE

This invention relates to a motor starter device comprising power current lines with separable contacts, and a contactor part provided with a control electromagnet and a protection part provided with at least one tripping device, that will control the current line poles through a mechanical control device, and a manual control button capable of opening poles on current lines.

Motor starter devices comprising a circuit breaker device and a contactor device already exist, in which the two devices are installed on a common base that is used to fix the complete assembly to a back support and to contain the monitoring and signaling conductors, these conductors connecting this device to automation devices, possibly through a bus system. These known devices include auxiliary contacts connected to the automation devices, the condition of these contacts being representative of the state of the power poles or the tripped state of the circuit breaker device. The structure of known devices needs to be improved, to improve localisation of contacts and the ease of actuation of these contacts.

The purpose of this invention is to propose a motor starter device structure capable of being put into different operating states and provided with auxiliary contacts for the transmission of information about these states, the structure considered grouping and simplifying the localisation and control of the auxiliary contacts.

According to the invention, the device is provided with a housing elongated along one determined direction, in which the current lines are enclosed and with which the contactor part and the protection part are associated; power poles state signaling contacts, tripped state signaling contacts and button state contacts, are arranged staggered on several levels in the direction along the length of the housing; two drive devices are associated with the mechanical control device extending along the direction of the length of the housing and actuating different levels of signaling contacts, namely a first drive device controlled by the control electromagnet and a second drive device used by the tripping device or the manual control button.

The drive devices are preferably a two-position linkage that signals the state of the poles, and a three-position linkage that signals the tripped state and the state of the button, capable of sliding along their own length parallel to the power current lines.

It is advantageous if the drive devices actuate pole state signaling contacts, tripped state signal contacts or button status contacts arranged in at least one removable block added onto the housing, at different staggered levels along the length of the housing and possibly in a fixed part of the housing in a strictly coordinated manner, making use of drive elements located at different positions along their length.

The description given below applies to a non-limitative embodiment of the invention with reference to the attached drawings.

FIG. 1 diagrammatically shows a motor starter device conform with the invention.

Figure 1:
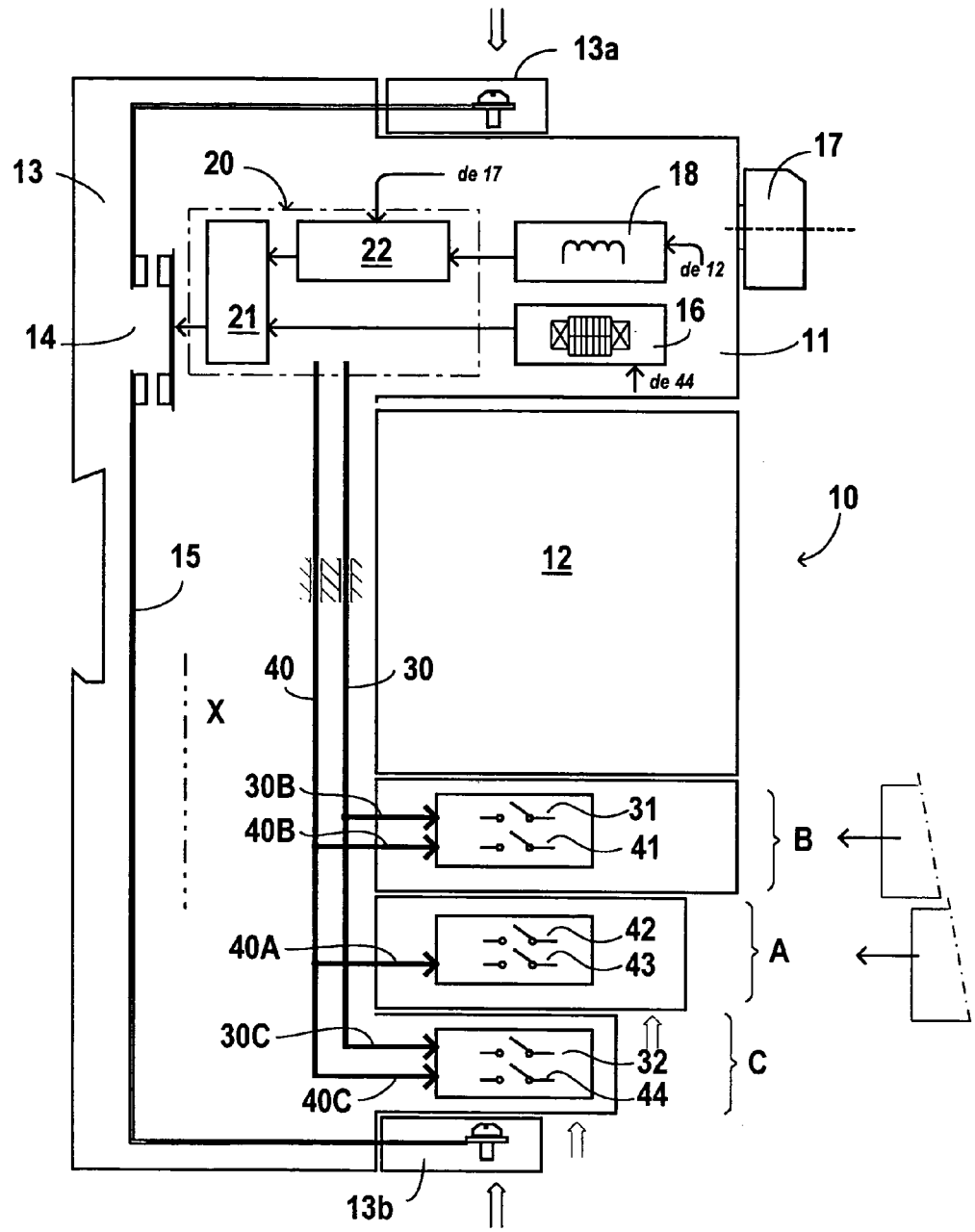

The motor starter device 10 shown comprises a control part 11 in contactor mode, a protection part 12 and a housing 13 in which the parts 11, 12 are enclosed or to which they are assembled. Depending on the case, the parts 11, 12 may be integrated into a single housing 13, or the part 12 may be added on removably to a housing 13 containing the part 11 (this is the case that is illustrated on FIG. 1) or the parts 11, 12 may be added on to the housing 13 similarly. In all cases, the housing 13 is elongated along a direction X, preferably vertical, and has separable single break or multiple break contacts 14, shown here as double break contacts, for the different power current lines 15 of the device.

The contacts 14 are controlled by the contactor part 11 as a function of the power supply to an electromagnet 16, or by the protection part 12 following a defect detected in the power current lines 15 by sensors not shown, or by a manual control button 17. The sensors are connected to the protection part 12, which in the case of a fault, controls opening of the contacts 14 through at least one electromagnetic or electronic tripping device 18. The manual control button 17 is provided on the front face of the device 10 and is used to manually open the contacts 14 and to rearm the device after tripping.

A mechanical device 20 acts on the contacts 14 to open and close them. The device 20 is housed in the housing 13 and it comprises a mechanism 21 on which the electromagnet 16 acts, and a mechanism 22 with which the button 17 and the tripping device 18 cooperate and which itself cooperates with mechanism 21, the mechanisms 21, 22 possibly having some parts in common. Furthermore, removable power terminal blocks 13a, 13b are placed near the top and the bottom of the housing 13 to connect power current lines 15 (along the direction of the arrows shown) to a power supply and a load.

The mechanism 22 drives a mobile part 40 that will actuate the first auxiliary signaling contacts and the mechanism 21 drives a mobile part 30 that will actuate second auxiliary signaling contacts. Although the parts 30 and 40 may be levers, the are preferably sliding linkages housed in the housing 13 and extending along the length of the housing (X direction) and guided so as to slide along their length (vertically as shown in FIG. 1).

The linkage 30 can thus be moved in translation from one working position to a standby position, and vice versa in response to switching of the electromagnet 16. It has conformations distributed along its length, for example the pins 30B, 30C for controlling the first contacts 31 and second pole state signaling contacts 32, and representative of the working or standby state of the device in contactor mode. The contacts 31 are located in a communications block or a signaling block B added on removably to the front of the housing 13, and the contacts 32 are integrated into a fixed part C of the housing 13; this part C is located at the bottom end of the housing. In more detail, the contacts 32 comprise a normally open type contact 32a and a normally closed type contact 32b. Contacts in block B denote mechanical contacts or electronic switches controlled by the movement of a mechanical part; block B may be connected to an automation device, particularly through a field bus connected to the front or side of the device using a connector not shown.

The linkage 40 can be moved in translation to move into three positions: an On position, an Off position and a tripped position, depending on the state of the mechanism 22, to represent the "ready" state, the "off" and the "trip" state of the device respectively. The linkage 40 is provided with conformations, for example pins 40B, 40A distributed along its length, to actuate the first signaling contacts 41 located in the removable communications or signaling block B, and second signaling contacts 42, 43 located in a removable add on part 8 adjacent to block B. Furthermore, the lower end of the linkage 40 is provided with a pin 40C provided to actuate a third contact 44, the function of which is to isolate the device (particularly the electromagnet coil) from its power supply. The power supply conductors of the device are connected to terminals 44A1, 44A2l (visible in FIG. 2) associated with the third contact 44 and located in part C of the housing 13. The presence of the pins on the same linkage enables coordinated actuation or linked actuation of the different contacts.

Figure 2:
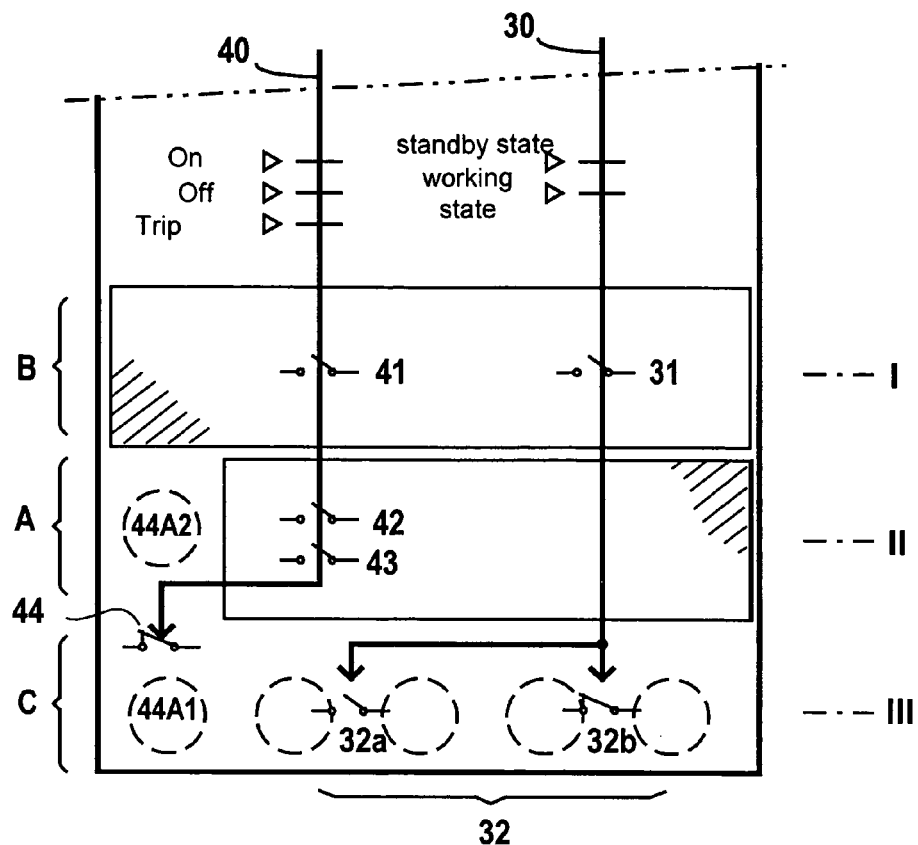
FIG. 2 shows a diagrammatic front view of the bottom part of the device.

As can be seen on FIGS. 1 and 2, the signaling contacts that have just been described are spread along the housing 13 at different levels corresponding to presence of the communications or signaling block B (level I), the additive or add-on part A (level II) and the integrated lower part (level III). The contacts of A, B and C are controlled from the pins or other drive elements through any normal mechanical transmission.

Figure 3:
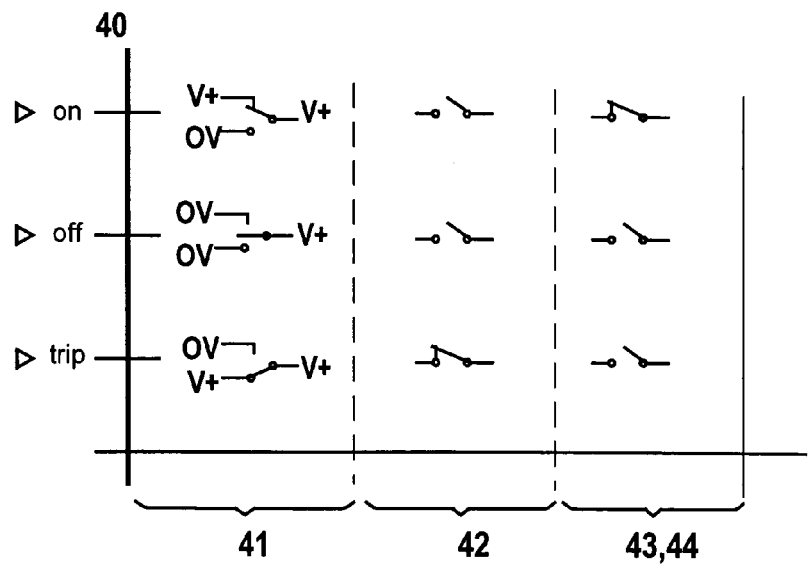
FIG. 3 illustrates the control formed by the three-position trip linkage.

FIG. 3 shows the state of the contacts 41,42,43,44 for the three positions of the device (On, Off and trip) in an example embodiment in which the switch 41 is of the three-state type. Thus, the potentials observed on the output lines of the switch 41 are V+ and 0 in the On position, 0 and 0 in the off position, and 0 and V+ in the tripped position. The contact 42 is open in the Off position and in the On position, and closed in the tripped position. The contacts 43 and 44 are closed in the On position and are open in the Off and tripped positions.

In one variant of the invention, the block B and the additive or add-on part A may be combined into a single removable block. In another variant, the part C may be located in an add on part, such that the block C, the add-on part A and the add-on part C are then both in the same removable add-on part fixed to the housing 13.

When the device is in the Off position, the electromagnet is no longer powered, the mechanism is assumed to be rearmed, and the contacts 14 are open. The linkage 40 is in its medium position (off position on FIGS. 2 and 3) and the linkage 30 in its standby position (FIG. 2) signaling that the poles are open, such that the switch 41 is in the neutral position (its first and second outputs being equal to 0), the contacts 42,43,44 are open, contacts 31 and 32a are open and contact 32b is closed.

To put the device into the On state, the button 17 is put into the On position such that the linkage 40 moves from its On position in which the first output from switch 41 changes to 1 (V+), while the contact 42 remains Open and the contacts 43, 44 close; the power poles 14 are then open or closed as a function of the power supply to the electromagnet 16. If the coil of the electromagnet is actually energized, the linkage 30 changes to its working position, which means that the poles are closed. The contacts 31 and 32a close and the contact 32b opens. If the electromagnet coil is not energized, the linkage 30 remains in the standby position.

When the device trips following a fault or a test operation, the linkage 40 changes to its tripped position and the second output from the switch 41 changes to 1 (V+), while the contacts 42 closes and the contacts 43,44 open. Since the contact 44 interrupts the power supply to the device, the linkage 30 moves to the standby position (if it was not already in the standby position), which opens the contacts 31 and 32a and closes contact 32b.

The invention claimed is:

1. A motor starter device, comprising:
   power current lines with separable contacts;
   a mechanical control device comprising at least one mechanism for actuating said separable contacts;
   a contactor part comprising a control electromagnet able to actuate said at least one mechanism;
   a protection part comprising at least one tripping device, said protection part able to actuate said at least one mechanism;
   a manual control button able to actuate said at least one mechanism;
   a housing for enclosing the power current lines, the housing connected to the contactor part and the protection part;
   power pole state signaling contacts, tripped state contacts, and manual control button state signaling contacts located at staggered positions on several levels along the length of the housing; and
   two drive devices connected to and controlled by the mechanical control device, such that when the control magnet actuates the at least one mechanism, the mechanical control device operates a first of the two drive devices, and when the tripping device or the manual control button actuates the at least one mechanism, the mechanical control device operates a second of the two drive devices, the two drive devices for actuating different signaling contact levels, wherein the two drive mechanisms are moveable mechanical linkages that extend along the length of the housing, said moveable mechanical linkages slideable along their own lengths parallel to the power current lines.

2. The device according to claim 1, wherein the movable mechanical linkages each comprises a two-position linkage for signaling the state of the poles, and a three-position linkage for signaling the tripped state and the state of the manual control button.

3. The device according to claim 1, wherein the two drive devices are for actuating pole state signaling contacts, tripped state signal contacts or manual control button state contacts, which are all linked together by a drive device and arranged in at least one removable block connected to the housing and located at staggered positions along the length of the drive devices, and in a fixed part of the housing.

4. The device according to claim 1, wherein the pole state signaling drive device is for actuating first contacts located in a communications or signaling block removably attached to the housing, and second contacts integrated into a fixed part of the housing, said first and second contacts linked together by drive elements and located at staggered positions along the length of the drive device, the block and the part of the housing being staggered on at least two levels.

5. The device according to claim 1, wherein the trip signaling drive device is for actuating trip first contacts located in a communications or signaling block, and second contacts housed in an add-on block, the add-on block and the communications or signaling block removably attached to the housing and placed adjacent to each other at two levels along the length of the housing, said first and second contacts linked together by drive elements, said first and second contacts located at staggered positions along the length of the trip signal device.

6. The device according to claim 1 wherein the trip signal device comprises a pin for actuating a contact to isolate the electromagnet coil, the contact located in a fixed part of the housing.

7. The device of claim 1 wherein the mechanical control device comprises at least two mechanisms, a first mechanism able to actuate said separable contacts and able to be actuated by at least one of said control magnet and a second mechanism, the second mechanism able to be actuated by at least one of said at least one tripping device and said manual control button.

8. The device of claim 7, wherein said first mechanism and said second mechanism share at least one mechanical part.

* * * * *